United States Patent
Chung et al.

(10) Patent No.: US 8,494,353 B2
(45) Date of Patent: Jul. 23, 2013

(54) IMAGE STABILIZER

(75) Inventors: Hae-in Chung, Uijeongbu-si (KR);
 Jin-won Lee, Seongnam-si (KR);
 Min-jae Lee, Seoul (KR); Jeong-hyun Shim, Seoul (KR); Sung-hyun Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/849,453

(22) Filed: Aug. 3, 2010

(65) Prior Publication Data

US 2011/0058799 A1 Mar. 10, 2011

(30) Foreign Application Priority Data

Sep. 4, 2009 (KR) .......................... 10-2009-0083313

(51) Int. Cl.
 *G03B 17/00* (2006.01)
(52) U.S. Cl.
 USPC ......... 396/55; 359/554; 359/557; 348/208.99
(58) Field of Classification Search
 USPC .......................... 396/55; 359/554; 348/208.99
 See application file for complete search history.

(56) References Cited

U.S. PATENT DOCUMENTS

| | | | |
|---|---|---|---|
| 7,742,691 B2 * | 6/2010 | Takahashi et al. | 396/55 |
| 7,778,535 B2 * | 8/2010 | Kobayashi | 396/55 |
| 7,826,733 B2 * | 11/2010 | Huang | 396/55 |
| 7,929,849 B2 | 4/2011 | Ohno | |
| 2006/0092285 A1 | 5/2006 | Shin | |
| 2006/0132613 A1 * | 6/2006 | Shin et al. | 348/208.7 |
| 2006/0279638 A1 | 12/2006 | Matsuda et al. | |
| 2008/0037980 A1 | 2/2008 | Okumura et al. | |
| 2008/0292296 A1 * | 11/2008 | Ryu et al. | 396/55 |
| 2010/0178044 A1 * | 7/2010 | Ohno | 396/55 |
| 2011/0188841 A1 | 8/2011 | Ohno | |

FOREIGN PATENT DOCUMENTS

| | | |
|---|---|---|
| EP | 2 009 494 | 12/2008 |
| JP | 2006-023664 | 1/2006 |
| JP | 2009162844 A * | 7/2009 |
| KR | 1020060032312 A * | 4/2006 |
| KR | 100663276 | 12/2006 |
| KR | 1020070014919 | 2/2007 |
| KR | 100703513 * | 4/2007 |
| KR | 1020090043585 | 5/2009 |

* cited by examiner

*Primary Examiner* — Rochelle-Ann J Blackman
*Assistant Examiner* — Linda B Smith
(74) *Attorney, Agent, or Firm* — The Farrell Law Firm, P.C.

(57) ABSTRACT

An image stabilizer that compensates for external vibrations by moving an imaging unit. The image stabilizer includes a first frame on which an imaging unit is installed, a second frame that is connected to the first frame using three points and guides movement of the first frame in a first direction and second direction, and a third frame that is connected to the second frame using three points and guides the first frame and the second frame to move in a third direction and fourth direction, which are perpendicular to the first and second directions.

20 Claims, 12 Drawing Sheets

IMAGE STABILIZER

PRIORITY

This application claims priority under 35 U.S.C. §119(a) to Korean Patent Application No. 2009-83313, which was filed in the Korean Intellectual Property Office on Sep. 4, 2009, the entire disclosure of which is incorporated herein by reference.

BACKGROUND OF THE INVENTION

1. Field of the Invention

The present application relates to an image stabilizer for minimizing an influence of disturbances, such as hand-shake, and provides a frame coupling structure with improved manufacturability.

2. Description of the Prior Art

In general, an image stabilizer is used in an electronic apparatus capable of capturing an image, such as a camera, and compensates for movement of the electronic apparatus while capturing an image, which may be due to hand-shake, external vibration, or shock. Basically, the image stabilizer moves an imaging unit, e.g., a Charge-Coupled Device (CCD) or a Complementary Metal-Oxide-Semiconductor (CMOS) sensor, or an optical lens formed on the front of the imaging unit in the direction of pitch/yaw.

Conventionally, a method of operating a compensation lens using an actuator including a rotor and stator with a compensation apparatus has been used to compensate for any displacement generated due to external vibration. Apparatuses utilizing this type of method include a shaft support apparatus, a ball support apparatus, and a suspension wire/spring apparatus.

The shaft support apparatus is generally designed as a two-component structure for moving a compensation lens or an imaging unit, and thus, sensitivity of the compensation may decrease as moving mass increases, and manufacturability may also worsen due to the complicated structure.

The ball support apparatus is also generally designed as a two-component structure, and therefore, the ball support apparatus shares the same problem of decreased compensation sensitivity due to increasing moving mass and degrading manufacturability, although the ball support apparatus may have an advantage in controlling the degree of rotation.

In the suspension wire/spring apparatus, the shape of a supporting material, i.e., a suspension wire or spring, may change while moving mass changes due to external disturbances. Further, energy absorption caused by the change of the shape may decrease in the compensation sensitivity of the image stabilizer.

Additionally, in the suspension wire/spring support apparatus, the degree of rotation of a light axis is not controlled, causing a further decrease in compensation sensitivity, when compared to the shaft support apparatus and the ball support apparatus.

Equation (1) represents the compensation sensitivity of an image stabilizer in the shaft support apparatus and the ball support apparatus, and Equation (2) represents the compensation sensitivity of an image stabilizer in the suspension wire/spring method.

$$K = \frac{F_{extern}}{\Delta x} \quad (1)$$

In Equation (1) K represents the compensation sensitivity, $F_{extern}$ represents an external driving force, and $\Delta x$ represents displacement of driving direction.

$$K = \frac{F_{extern} - F_{stiffness}}{\Delta x} \quad (2)$$

In Equation (2), K represents the compensation sensitivity, $F_{extern}$ represents an external driving force, $F_{stiffness}$ represents a force by suspension wire/spring, and $\Delta x$ represents a displacement of driving direction.

SUMMARY OF THE INVENTION

An aspect of the present invention is to provide an image stabilizer that operates in the direction of compensation (pitch, yaw) and controls movement in other directions, and has a simplified structure for enhanced manufacturability.

Another aspect of the present invention is to provide a slim and compact image stabilizer to reduce moving mass, wherein system stiffness can be easily added to improve controllability regarding a compensation direction.

In accordance with an aspect of the present invention, an image stabilizer is provided that compensates for external vibrations by moving an imaging unit. The image stabilizer includes a first frame on which the imaging unit is installed, a second frame that is connected to the first frame through three points and guides movement of the first frame in a first direction and a second direction, and a third frame that is connected to the second frame through three points and guides the first frame and the second frame to move in a third direction and a fourth direction, which are perpendicular to the first and second directions.

In accordance with another embodiment of the present invention, an image stabilizer is provided that compensates for external vibrations by moving a lens unit. The image stabilizer includes a first frame on which a lens unit is installed, a second frame that is connected to the first frame through three points and guides movement of the first frame in a first direction and a second direction, and a third frame that is connected to the second frame through three points and guides the first frame and the second frame to move in a third direction and a fourth direction, which are perpendicular to the first and second directions.

BRIEF DESCRIPTION OF THE DRAWINGS

The above and/or other aspects of the present disclosure will be more apparent will be more apparent from the following detailed description taken in conjunction with reference to the accompanying drawings, in which.

DETAILED DESCRIPTION OF EMBODIMENTS OF THE INVENTION

Certain embodiments of the present invention are described in greater detail below with reference to the accompanying drawings. In the following description, like drawing reference numerals are used for the like elements, even in different drawings. The matters defined in the description, such as detailed construction and elements, are provided to assist in a comprehensive understanding of exemplary embodiments. Also, well-known functions or constructions are not described in detail in order to avoid obscuring the present invention with unnecessary detail.

Figure 1:
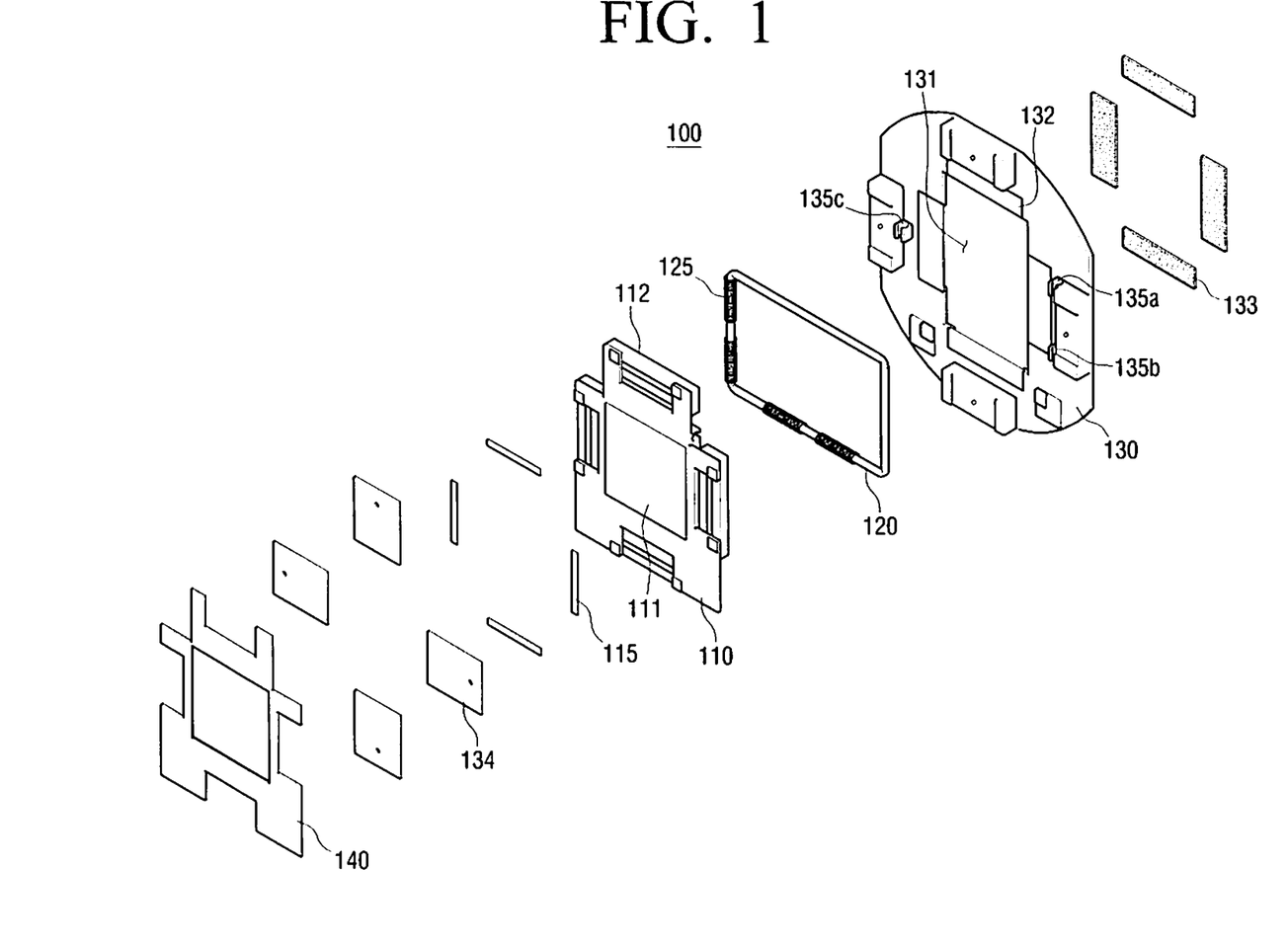
FIG. 1 illustrates an exploded perspective view of an image stabilizer according to an embodiment of the present invention.

FIG. 1 illustrates an exploded perspective view of an image stabilizer according to an embodiment of the present invention.

Referring to FIG. 1, an image stabilizer 100 includes a first frame 110 having an imaging unit 111, a second frame 120, a third frame 130, and a printing circuit board 140 having a controller. A connection portion that connects the first frame 110 and the second frame 120 through three points and a connection portion that connects the second frame 120 and the third frame 130 through three points do not interfere with each other.

Figure 2:
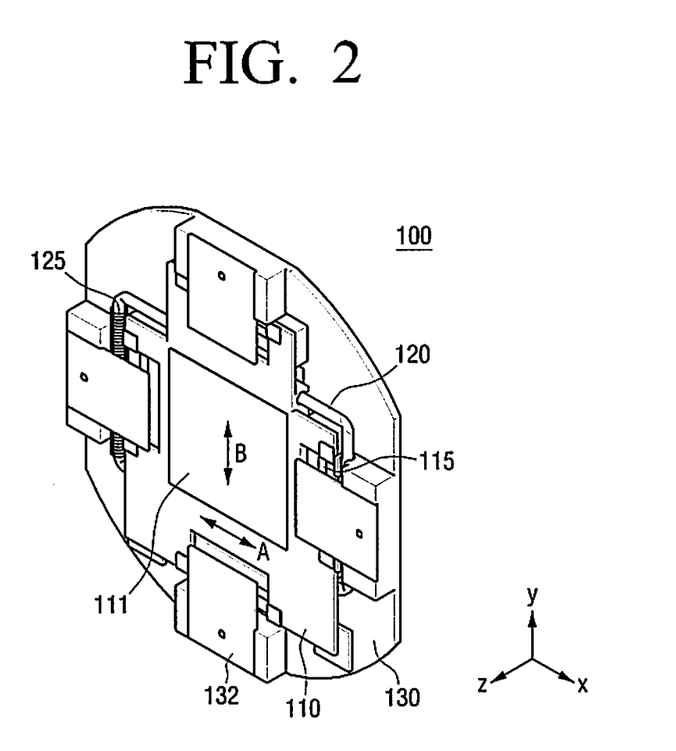
FIG. 2 illustrates a combined perspective view of the image stabilizer illustrated in FIG. 1 according to an embodiment of the present invention.

FIG. 2 illustrates a combined perspective view of the image stabilizer illustrated in FIG. 1 according to an embodiment of the present invention.

Referring to FIG. 2, the first frame 110 is a moving frame and is connected to the second frame 120 and the third frame 130 so that the first frame can move in a first direction and a second direction, i.e., up and down, as marked with arrow B, and in a third direction and a fourth direction, which are perpendicular to arrow B, i.e., left and right, as marked with arrow A, in order to compensate for external disturbances, such as hand-shake. In FIG. 2, only the first frame 110 moves in the first and second directions, and the first frame 110 and the second frame 120 both move together in the third and fourth directions.

Accordingly, because movement of the first frame 110 is restricted to moving only in the first, second, third, and fourth directions, i.e., the directions of yaw/pitch, operation sensitivity is enhanced.

The connection structure of the first frame 110, the second frame 120, and the third frame 130, which enables the above movement, will be described in more detail below.

Figure 3:
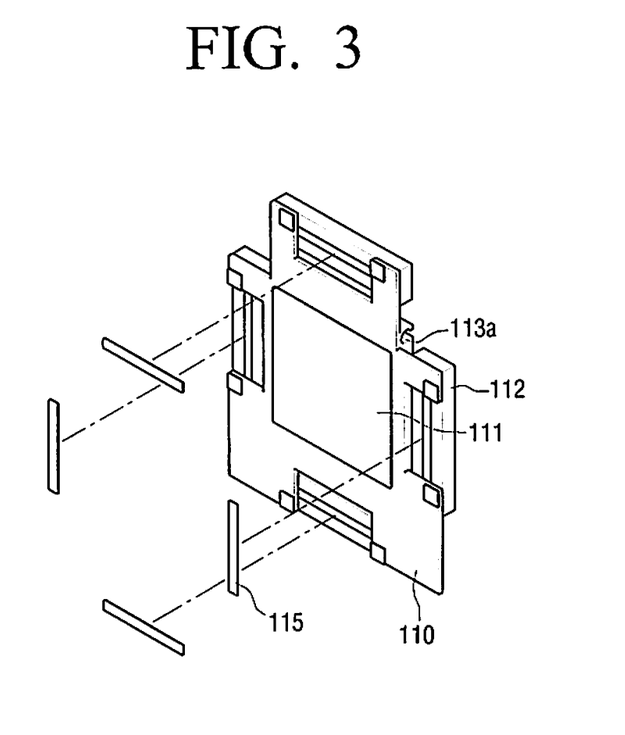
FIGS. 3 and 4 illustrate front and rear views, respectively, of a first frame according to an embodiment of the present invention.
Figure 4:
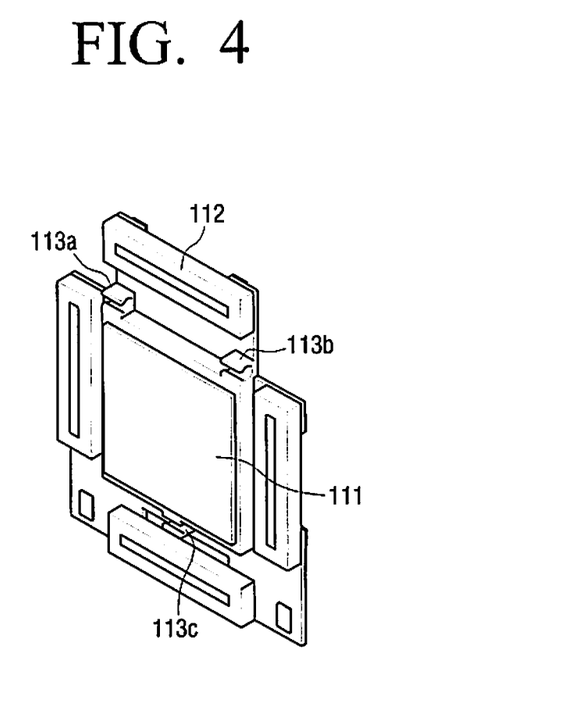

FIGS. 3 and 4 illustrate front and rear views, respectively, of a first frame according to an embodiment of the present invention.

Referring to FIGS. 3 and 4, the first frame 110 is a moving frame and is connected to the second frame 120 in three points so that the first frame 110 can move along the x-axis direction (see FIG. 2) along the second frame 120.

Generally, in order to completely restrict the movement of an object in a specific direction, a guide is installed to restrict movement and rotation movement. However, in order for good movement response of the first frame 110, a certain degree of freedom should be guaranteed for the first frame 110. Accordingly, in accordance with an embodiment of the present invention, three points of support and connection are used to provide a sufficient degree of freedom.

Referring to FIGS. 3 and 4, an imaging unit 111, a coil winding unit 112, first to third connection portions 113a, 113b, and 113c, and a stabilizer 115 are installed on the first frame 110. The imaging unit 111, e.g., a CCD or a CMOS, is disposed at the center of the first frame 110 for converting an image photographed by a user into an electric signal and transmitting the electric signal to a controller.

When power is applied, the coil winding unit 112 causes the first frame 110 to move in the first or second direction or the third or fourth direction by magnetic repulsive force against a magnet 132 installed on the third frame 130 facing the coil winding unit 112.

The three connection portions 113a, 113b, and 113c connect the second frame at three points, and the first and the second connection portions 113a and 113b are disposed on an upper portion of the imaging unit 111 and the third connection portion 113c is disposed on a lower portion of the imaging unit 111, as illustrated in FIG. 4, or vice versa.

Figure 5:
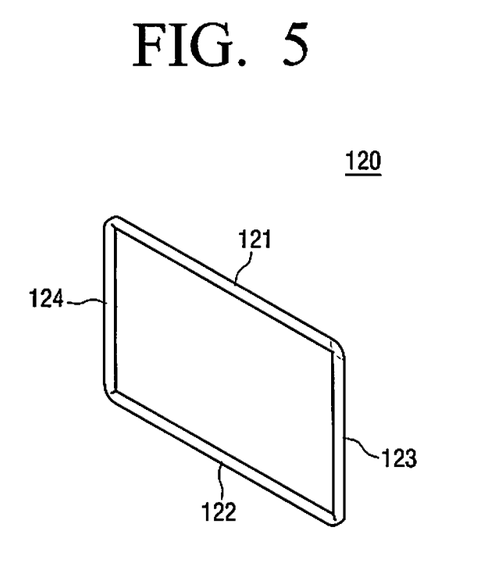
FIGS. 5 and 6 illustrate perspective views of a second frame according to an embodiment of the present invention.

The three connection portions 113a, 113b, and 113c are formed corresponding to the shape of the first and the second support portions 121 and 122 of the second frame 120 (see FIG. 5). The second frame 120 an opening in the coupling direction so that the three connection portions 113a, 113b, and 113c can be snap-fit into each of the first and the second support portions 121 and 122. In addition, the three connection portions 113a, 113b, and 113c are formed in a lengthwise direction of the first and the second support portions 121 and 122, such that the first frame 110 moves only in the first and second directions, and not in the third or fourth directions.

The stabilizer 115 enables the first frame 110 to be positioned as close as possible to the third frame 130, and may be formed by steel, for example. The stabilizer 115 may be disposed on the opposite side of the coil winding unit 112 facing the magnet 132 (see FIG. 1). If the stabilizer 115 is disposed between the magnet 132 and the coil winding unit 112, the first and the third frames 110 and 130 may stick to each other due to strong magnetism, thereby compromising the movement of the first and the second frames 110 and 120.

Figure 6:
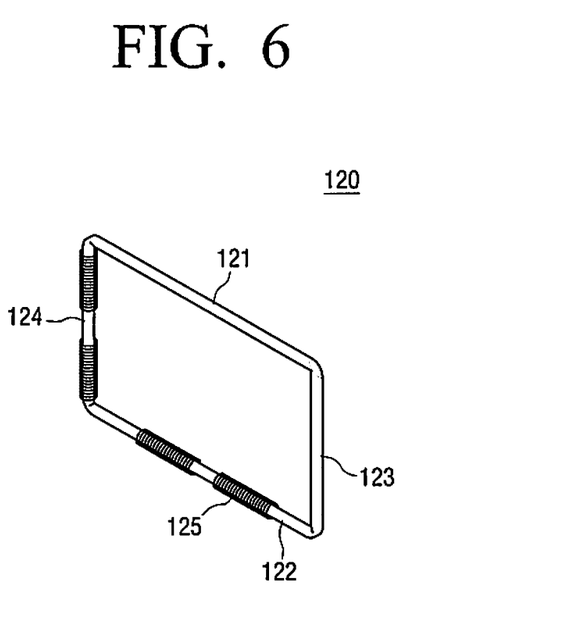

FIGS. 5 and 6 illustrate perspective views of a second frame according to an embodiment of the present invention.

Referring to FIG. 5, the second frame 120 includes first to the fourth support portions 121, 122, 123, and 124. The four support portions 121, 122, 123, and 124 may be formed in a cylindrical shape so that the first and the third frames 110 and 130 can move freely in the first, second, third, and fourth directions. The first and the second support portions 121 and 122 and the third and the fourth support portions 123 and 124 are disposed parallel to each other, forming a rectangular shape.

Referring to FIG. 6, a plurality of elastic members 125, e.g., coil springs, are disposed in the second and the fourth support portions 122 and 124, and the system stiffness may be adjust to have optimum control performance. If external disturbances, such as hand-shakes, are compensated for by moving the first frame 110, system linearity should be secured in a compensation frequency band for controlling the movement of the first frame 110.

In general, the frequency band of hand-shake is in a low frequency band, e.g., 0~20 Hz, and thus, in order to secure system linearity in the hand-shake frequency band, a spring coefficient and a damping coefficient of an image stabilizer should be adjusted appropriately. The mechanical feature of a system includes not only the spring coefficient and the damping coefficient, but also degree of freedom, mass, and external force. Because set values of degree of freedom, mass, and external force are difficult to modify after system establishment, system linearity may be secured by using a plurality of elastic materials 125 as described above.

Figure 7:
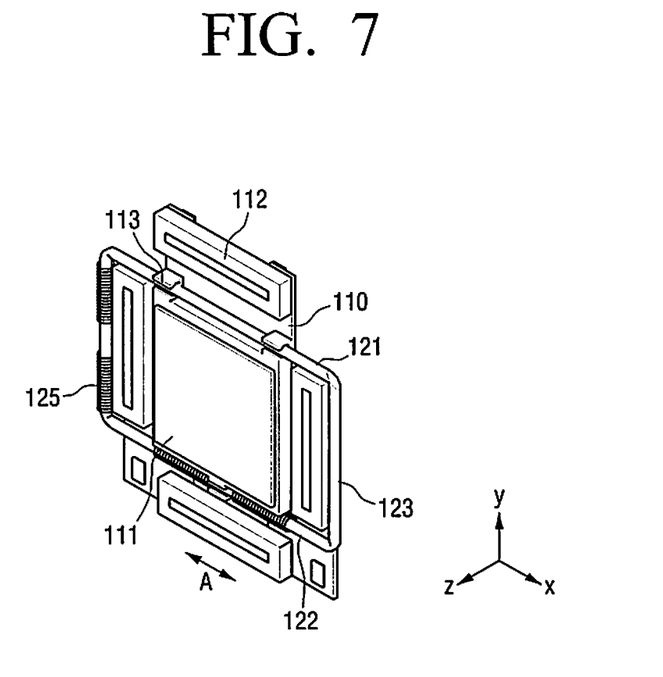
FIG. 7 illustrates a perspective view in which the first and the second frames are combined according to an embodiment of the present invention.

FIG. 7 illustrates a perspective view in which the first and the second frames are combined according to an embodiment of the present invention.

Figure 10:
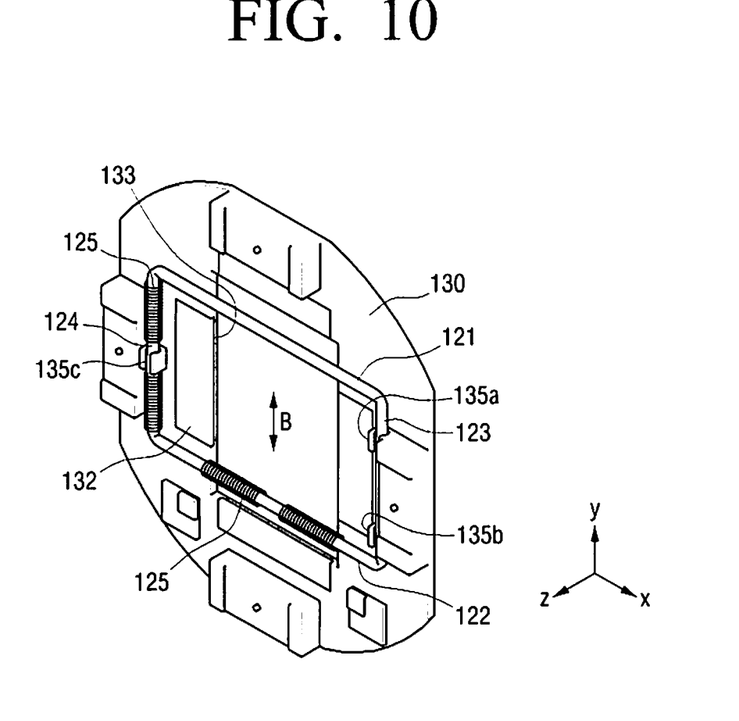
FIG. 10 illustrates a perspective view in which the second and the third frames are combined according to an embodiment of the present invention.

Referring to FIG. 7, the first and the second frames 110 and 120 are installed on the third frame 130, such that the first and the second frames 110 and 120 move together in the y-axis direction, i.e., perpendicular to the first and second directions on the x-axis, as marked with arrow B in FIGS. 2 and 10. That is, the first and the second connection portions 113a and 113b are snap-fit into the first support portion 121 of the second frame 120, and the third connection portion 113c is snap-fit into the second support portion 122 of the second frame 120. Accordingly, the first frame 110 is guided to move in the first and second directions, i.e., along the x-axis as marked with arrow A, with regard to the second frame 120, and is restricted from moving in the y and z directions.

Figure 8:
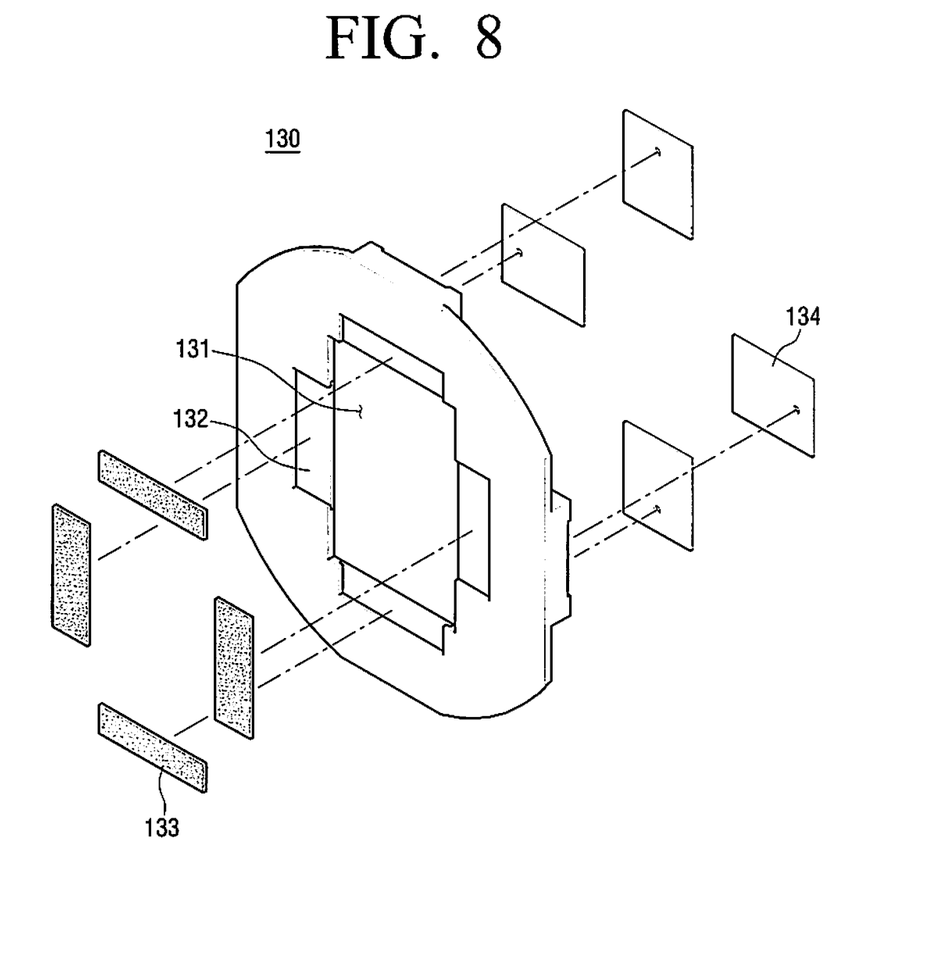
FIGS. 8 and 9 illustrate front and rear views of a third frame according to an embodiment of the present invention.
Figure 9:
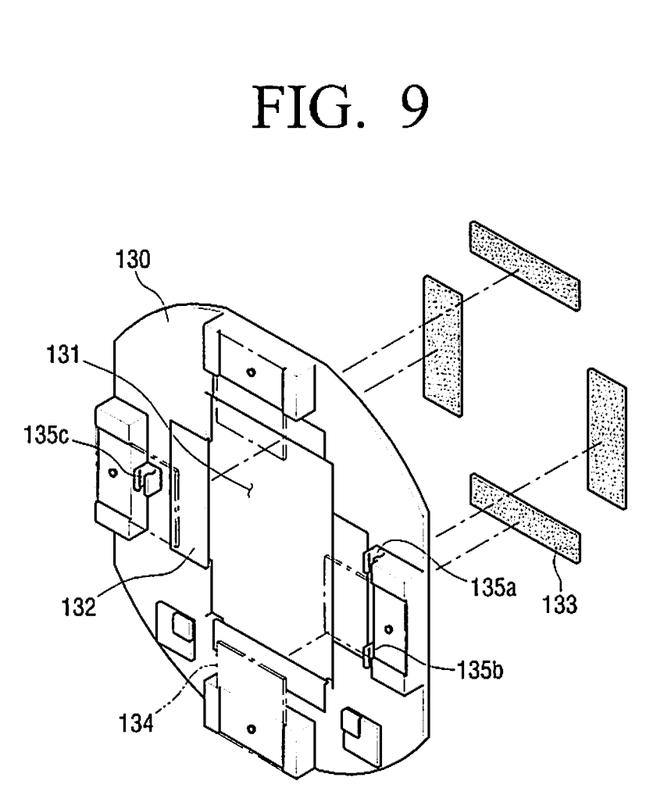

FIGS. 8 and 9 illustrate front and rear views of a third frame 130 according to an embodiment of the present invention.

Referring to FIGS. 8 and 9, the third frame 130 is fixed on the main body of an electronic apparatus (not shown), and a perforation 131 is formed at the center so that the imaging unit 111 in the first frame 110 can be exposed.

The magnet 132 is installed on a portion of the third frame 130 corresponding to the coil winding unit 112, and the first and the second yokes 133 and 134 are fixedly installed so as to cover front and rear of the coil winding unit 112 and the magnet 132.

The first yoke 133 is formed on the opposite side of the coupling of the third frame 130 and the second frame 120, and is fixedly installed on the other side of the first yoke 133, such that the second yoke 134 can stick to the stabilizer 115. Accordingly, the second frame 120 is disposed between the first and the second yokes 133 and 134. For example, the first and the second yokes 133 and 134 may be formed of a metal material, such as steel.

If the first and the second yokes 133 and 134 are disposed as described above, the loss of magnetism generated from the coil winding unit 112 and the magnet 132 can be minimized, and the second frame 120 is not separated from the third frame 130.

FIG. 10 is a perspective view in which the second frame 120 and the third frame 130 are coupled according to an embodiment of the present invention.

Referring to FIG. 10, the third support portion 123 of the second frame 120 is snap-fit into the fourth and the fifth connection portions 135a and 135b of the third frame 130, and the fourth support portion 124 is snap-fit into the fifth connection portion 135c of the third frame 130. In addition, the fifth connection portion 135c may be disposed between the fourth and the fifth connection portions 135a and 135b.

The fourth to the sixth connection portions 135a, 135b, and 135c are formed corresponding to the shape of the third and the fourth support portions 123 and 124 of the second frame 120 (see FIG. 5). The second frame 120 has an opening in the coupling direction so that the fourth to the sixth connection portions 135a, 135b, and 135c can be snap-fit into each of the third and the fourth support portions 123 and 124. In addition, the fourth to the sixth connection portions 135a, 135b, and 135c are formed in a lengthwise direction of the third and the fourth support portions 123 and 124 so that the second frame 120 does not move in the first and second directions. Due to the three point connection, the second frame 120 may move in the second direction with respect to the third frame 130, as marked with arrow B (y axis direction) in FIG. 10.

As illustrated in FIG. 7, the first frame 110 connected to the second frame 120 moves only in the directions marked with arrow A in FIG. 7, i.e., in the first and second directions, and is restricted from moving in any other directions by the first to the third connection portions 113a, 113b, and 113c. Therefore, the first frame 110, together with the second frame 120, moves in the third and fourth directions marked with arrow B in FIGS. 2 and 10.

If the third frame 130 is fixed to an electronic apparatus, only the first frame 110 may move in the first and second directions, i.e., yaw direction, and the first frame 110 and the second frame 120 may move together in the third and fourth directions, i.e., pitch direction, because the first and the second direction may move corresponding to the relative movement of the third frame 130. However, the first and the second frames 110 and 120 do not move in the rolling direction or in the tilting direction. Therefore, the first frame 110, i.e., a moving frame, is easily and accurately controlled.

In the above-described embodiments, the imaging unit 111 is installed on the first frame 110 to compensate for external vibrations by moving the imaging unit 111 on which an image is formed. Alternatively, instead of using the imaging unit 111, a lens unit 111' may be formed on the first frame 110 as illustrated in FIGS. 11 and 12.

Figure 11:
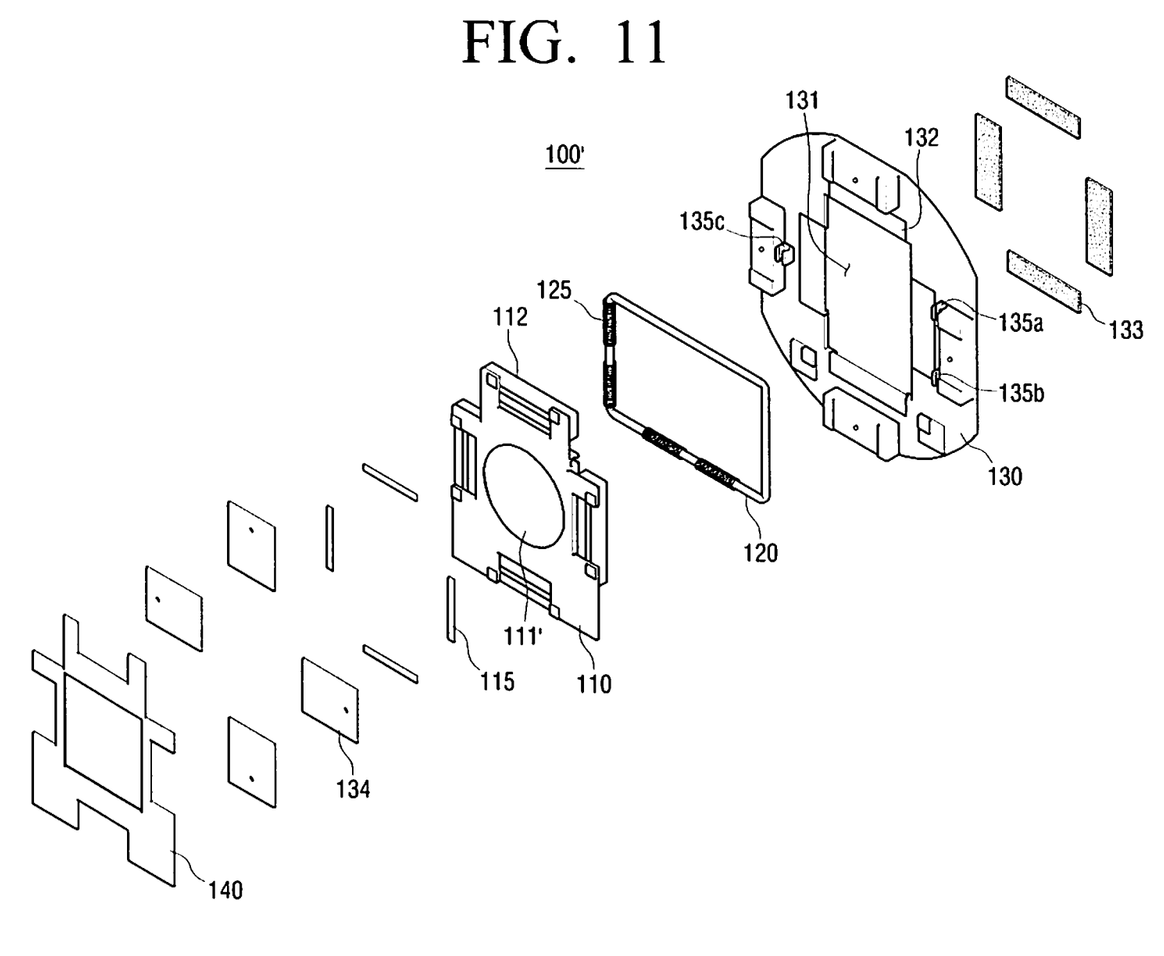
FIG. 11 illustrates an exploded perspective view of an image stabilizer according to an embodiment of the present invention.
Figure 12:
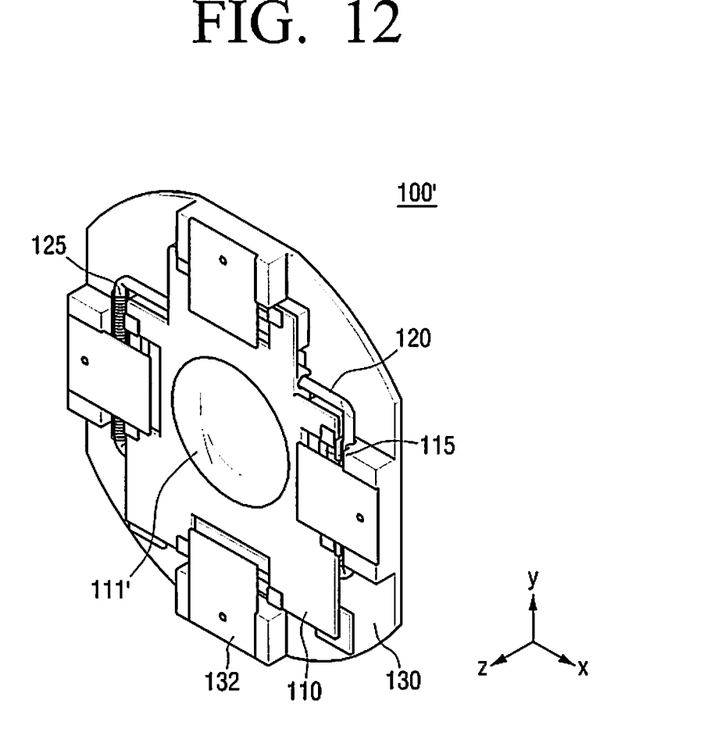
FIG. 12 illustrates a combined perspective view of the image stabilizer illustrated in FIG. 11 according to an embodiment of the present invention.

Referring to FIGS. 11 and 12, in an image stabilizer according to an embodiment of the present invention, the lens unit 111' is installed on the first frame 110, and an image formed on the imaging unit (not shown) is compensated by moving the lens unit 111'. The other configurations and operations of the apparatus illustrated in FIGS. 11 and 12 are the same as described above in FIGS. 1-10.

According to the above-described embodiments of the present invention, assembly of image stabilizers is much simpler than that of the prior art image stabilizers. In addition, due to a decrease in moving mass, the image stabilizer may be slimmer and more compact, and have better controllability in terms of compensation direction. Further, it is easier to compensate for a value of a physical property because stiffness can be easily adjusted according to each system.

Although certain embodiments of the present invention have been shown and described above, it will be appreciated by those skilled in the art that changes may be made in these embodiments without departing from the principles and spirit of the present invention, the scope of which is defined in the attached claims and their equivalents.

What is claimed is:

1. An image stabilizer that compensates for external vibrations by moving an imaging unit, the image stabilizer comprising:
   a first frame on which the imaging unit is installed;
   a second frame that is connected to the first frame using three points and guides movement of the first frame in a first direction and a second direction; and
   a third frame that is connected to the second frame using three points and guides the first frame and the second frame to move in a third direction and a fourth direction, which are perpendicular to the first and second directions,
   wherein the second frame comprises:
   a first support portion;
   a second support portion that is disposed in parallel to and on a same surface as the first support;

a third support portion that is perpendicularly connected to the first and the second support portions on the same surface as the first and the second support portions; and
a fourth support portion that is perpendicularly connected to the first and the second support portions on the same surface as the first and the second support portions,
wherein the first, second, third, and fourth support portions are connected to each other, forming a rectangular shape,
wherein the second frame is integrated in form.

2. The image stabilizer of claim 1, wherein the three points with which the second frame is connected to the first and the three points with which the second frame is connected to the third frame do not interfere with each other.

3. The image stabilizer of claim 1, wherein the first frame comprises:
a first connection portion that is connected to the first support portion;
a second connection portion that is connected to the first support portion; and
a third connection portion that is connected to the second support portion.

4. The image stabilizer of claim 1, wherein the first frame comprises a plurality of coil winding units, and
wherein a magnet is installed on the third frame, in a position facing the plurality of coil winding units.

5. The image stabilizer of claim 3, wherein the third frame comprises:
a fourth connection portion that is connected to the first support portion;
a fifth connection portion that is connected to the first support portion; and
a sixth connection portion that is connected to the fourth support portion.

6. The image stabilizer of claim 4, wherein the coil winding unit comprises a stabilizer that is installed on an opposite surface of a surface facing the magnet.

7. The image stabilizer of claim 5, wherein the first, second, third, fourth, fifth, and sixth connection portions snap-fit into the first, second, third, and fourth support portions, respectively.

8. The image stabilizer of claim 6, wherein the third frame comprises:
a first yoke that is installed on an opposite surface of a surface facing the coil winding unit; and
a second yoke that is installed on an opposite surface of a surface facing the coil winding unit and the stabilizer of the first frame, which is an other side of the first yoke,
wherein the second yoke prevents the first frame from separating from the third frame.

9. The image stabilizer of claim 8, wherein the second frame comprises a plurality of elastic members that are installed on the second and fourth support portions.

10. The image stabilizer of claim 9, wherein at least one of the plurality of elastic members comprises a coil spring.

11. An image stabilizer that compensates for external vibrations by moving a lens unit, the image stabilizer comprising:
a first frame on which the lens unit is installed;
a second frame that is connected to the first frame using three points and guides movement of the first frame in a first direction and second direction; and
a third frame that is connected to the second frame using three points and guides the first frame and the second frame to move in a third direction and a fourth direction, which are perpendicular to the first and second directions, where in the second frame comprises:
a first support portion;
a second support portion that is disposed in parallel to and on a same surface as the first support;
a third support portion that is perpendicularly connected to the first and the second support portions; and
a fourth support portion that is perpendicularly connected to the first and the second support portions,
wherein the first, second, third, and fourth support portions are connected to each other forming a rectangular shape,
wherein the second frame is integrated in form.

12. The image stabilizer of claim 11, wherein the three points with which the second frame is connected to the first frame and the three points with which the second frame is connected to the first and third frames do not interfere with each other.

13. The image stabilizer of claim 11, wherein the first frame comprises:
a first connection portion this connected to the first support portion;
a second connection portion that is connected to the first support portion; and
a third connection portion that is connected to the second support portion.

14. The image stabilizer of claim 11, wherein the first frame comprises a plurality of coil winding units, and
wherein a magnet is installed on the third frame, in a position facing the plurality of coil winding units.

15. The image stabilizer of claim 13, wherein the third frame comprises:
a fourth connection portion that is connected to the first support portion;
a fifth connection portion that is connected to the first support portion; and
a sixth connection portion that is connected to the fourth support portion.

16. The image stabilizer of claim 14, wherein the coil winding unit comprises a stabilizer that is installed on an opposite surface of a surface facing the magnet.

17. The image stabilizer of claim 15, wherein the first, second, third, fourth, fifth, and sixth connection portions snap-fit into the first, second, third, and fourth support portions, respectively.

18. The image stabilizer of claim 16, wherein the third frame comprises:
a first yoke that is installed on an opposite surface of a surface facing the coil winding unit; and
a second yoke that is installed on the opposite surface of the surface facing the coil winding unit and the stabilizer of the first frame, which is an other side of the first yoke,
wherein the second yoke prevents the first frame from separating from the third frame.

19. The image stabilizer of claim 18, wherein the second frame comprises a plurality of elastic members that are installed on the second support portion and the fourth support portion.

20. The image stabilizer of claim 19, wherein at least one of the plurality of elastic members comprises a coil spring.

* * * * *